US005592555A

United States Patent [19]
Stewart

[11] Patent Number: 5,592,555
[45] Date of Patent: Jan. 7, 1997

[54] WIRELESS COMMUNICATIONS PRIVACY METHOD AND SYSTEM

[75] Inventor: Brett B. Stewart, Austin, Tex.

[73] Assignee: Advanced Micro Devices, Inc., Sunnyvale, Calif.

[21] Appl. No.: 226,717

[22] Filed: Apr. 12, 1994

[51] Int. Cl.[6] .................................................. H04L 9/00
[52] U.S. Cl. ........................ 380/49; 380/48; 380/29; 380/9
[58] Field of Search .................................. 380/9, 28, 29, 380/49, 48; 379/93, 95

[56] References Cited

U.S. PATENT DOCUMENTS

| | | | |
|---|---|---|---|
| 4,790,012 | 12/1988 | Sutphin, Jr. .................... | 380/21 |
| 5,068,889 | 11/1991 | Yamashita ....................... | 379/62 |
| 5,073,932 | 12/1991 | Yossifor et al. ................ | 380/23 |
| 5,077,790 | 12/1991 | D'Amico et al. ............... | 380/23 |
| 5,150,401 | 9/1992 | Ashby et al. .................... | 360/29 |
| 5,153,919 | 10/1992 | Reeds, III et al. ............. | 380/44 |
| 5,179,571 | 1/1993 | Schilling ......................... | 375/1 |
| 5,204,902 | 4/1993 | Reeds, III et al. ............. | 380/23 |
| 5,212,684 | 5/1993 | MacNamee et al. ........... | 370/24 |
| 5,216,419 | 6/1993 | Fujisaka et al. ............. | 340/825.54 |
| 5,237,612 | 8/1993 | Raith ................................ | 380/49 |
| 5,243,653 | 9/1993 | Malek et al. .................... | 380/49 |
| 5,325,419 | 6/1994 | Connolly et al. ............... | 380/49 |
| 5,384,847 | 1/1995 | Hendrickson et al. .......... | 380/23 |
| 5,392,355 | 2/1995 | Khurana et al. ................ | 380/23 |
| 5,392,357 | 2/1995 | Bulfer et al. ................... | 380/33 |
| 5,406,627 | 4/1995 | Thompson et al. ............ | 380/20 |
| 5,410,599 | 4/1995 | Crowley et al. ................ | 380/49 |

*Primary Examiner*—David C. Cain
*Attorney, Agent, or Firm*—Baker & Botts, L.L.P.

[57] ABSTRACT

A method and system for privately communicating signals over a wireless communications network include the steps of and circuitry and instructions for processing communication signals in a first signal processing circuit within a first communications controller circuit at a first location to produce processed communication signals. The processed communication signals may be processed voice communication signals or any arbitrary data stream that is to be communicated from one point to another. These processed communication signals are then enciphered and transmitted from the first location to a second location over a wireless communications network where a second communications controller circuit deciphers and decompresses the received communication signals. The enciphering and deciphering may occur in a digital signal processor of the communications controller circuit. The invention permits employing yet unspecified schemes or to provide a mobile device a certain amount of ubiquitousness, since it may employ one privacy scheme in one venue and a different one in another circumstance, the method and system permit facile use of politically correct privacy schemes in different jurisdictions very flexibly.

60 Claims, 4 Drawing Sheets

WIRELESS COMMUNICATIONS PRIVACY METHOD AND SYSTEM

TECHNICAL FIELD OF THE INVENTION

This invention relates to the broad field of wireless communication systems and, more particularly, to a wireless communications method and system that provides easily reprogrammable privacy in wireless communications.

BACKGROUND OF THE INVENTION

Acceptable privacy systems for wireless communications systems such as cordless and cellular telephones have in common some way of authenticating a mobile unit. Once authentication occurs, the mobile unit may communicate with a base station or another mobile unit. After authentication, however, no standard or easily adaptable method or system exists to ensure that wireless communications are private or secure. The ease with which a skilled person can intercept wireless communications establishes a need for privacy in these communications. Moreover, as cellular telephones become increasingly wide-spread, the need for privacy in these communications will surpass its current high level.

To implement known privacy schemes in wireless communications requires additional circuitry that increases the purchase price of these systems. For example, U.S. Pat. No. 5,153,919 to Reeds et al. (hereinafter Reeds) describes an authentication and data encryption/decryption technique that requires both additional circuitry and additional cellular telephone systems software reprogramming. This scheme substantially increases the cellular telephone unit purchase price for systems that use it. Competitive market forces, however, continue to require that the purchase price of cellular or cordless telephones and other wireless communication systems remain as low as possible.

Any system that protects wireless communications must also be flexible to combat creative attempts to violate or render ineffective the associated privacy scheme. A problem with systems similar to that of Reeds, to the contrary, is that the authentication and encryption circuitry has a high likelihood of becoming outmoded and its utility diminishing once its operation becomes well-known. Furthermore, the combination of technology variances, jurisdictional variances, differing legal constraints on use of otherwise private information, and the various and ever changing legal tests and standards that provide privacy in electronic communications all require flexibility in any approach to making wireless communications private. Existing systems cannot respond to these differing circumstances. In fact, there does not exist a method and system that provides a flexible privacy scheme for wireless communications that is both economical to use and adaptable to existing and future wireless communications scenarios.

SUMMARY OF THE INVENTION

The present invention, accordingly, provides a wireless communications privacy method and system that overcomes or reduces disadvantages and limitations associated with existing methods and systems of making wireless communications private or secure.

One aspect of the invention, therefore, is a communications controller that provides private communication of communications signals such as voice, local area network, or signals over a wireless communications network. The controller includes a signal processing circuit for processing the communications signals to form processed communication signals and for enciphering the processed communications signals. Processing may include encoding, compression, forward error correction and channel equalization of the communication signals. For example, a base band chip such as the CT2 telephone control circuit having the name Am79C410 that Advanced Micro Devices of Sunnyvale, Calif. produces (hereinafter generally called the "79C410") may perform the encoding and compression base band functions. A separate chip may perform the radio frequency (RF) function of channel equalization. A transceiver associates with the communications controller to transmit the enciphered and processed communication signals that the communication controller circuit produces.

A further aspect of the present invention is a system that includes the above communications controller at a first sending location such as a mobile unit and a chip communications controller at a receiving location that receives the enciphered and processed communications signals. The receiving communications controller circuit deciphers and processes the communications signals for completing the wireless transmission. At the second communications controller, processing includes decoding, decompressing, forward error correction and channel equalization, if necessary. Again, this may entail the use of a base band chip for some functions and a radio function chip for other RF functions.

The present invention may be employed in the communications controller circuit of a cordless telephone such as AM 79C410. Additionally, other wireless communication circuits could incorporate signal processing such as that of the present invention for communications signal processing and enciphering to provide the desired private communications over a wireless network. Such signals may include a wide variety of data types including, for example, an arbitrary data stream over a wireless local area network, or any of a number of wide are network schemes.

A technical advantage of the present invention is that it more completely uses computational power that may be available at prescribed clock rates for cordless telephone and other wireless applications. For example, the 79C410, while in use, has computational power at its operating clock rate that permits implementing enciphering and deciphering algorithms to make voice communications private. The computations that take place providing this privacy do not, therefore, affect the proper operation of the 79C410 or other similar controller circuits.

Another technical advantage of the present invention is that it utilizes the signal processing circuit of a single chip wireless communications controller not only for processing functions such as communications signal compression, encoding, and radio channel equalization, but also for enciphering and deciphering the processed signals. In the manufacture of a communications controller circuit according to the present invention, only a minimal amount of additional circuitry and instructions are necessary to accommodate a wide variety of enciphering algorithms. This provides privacy in wireless communications controller circuits at minimal additional manufacturing costs while providing a desirable degree of system flexibility.

Yet another technical advantage of the present invention is that it permits the manufacture of a "cryptographically neutral" device that may be enabled at an end point market. The controller circuit that the present invention employs allows embedding the enciphering and deciphering algorithms, as appropriate, for the particular legal or political jurisdiction in which a user seeks to use the communications device. This permits the purchaser or retailer to use the local definition of an acceptable or politically correct enciphering algorithm in the system with only a minimal amount of reprogramming.

Still a further technical advantage of the present invention is that it flexibly uses a wide array of enciphering and deciphering algorithms within the signal processing circuit both for authentication between two communicating units and for developing a session key that maintains private communications between the two locations.

An even further important technical advantage of the present invention is that it not only provides enciphering and deciphering for security purposes, but also provides at low cost flexible features such as compression and decompression of communication signals and forward error correction of these signals.

BRIEF DESCRIPTION OF THE DRAWINGS

The above and other technical advantages of the present invention will become more readily understood when the invention is described in further detail below, reference being made to the accompanying drawings in which like reference numerals represent like parts throughout and in which.

DETAILED DESCRIPTION OF THE ILLUSTRATIVE EMBODIMENT

Figure 1:
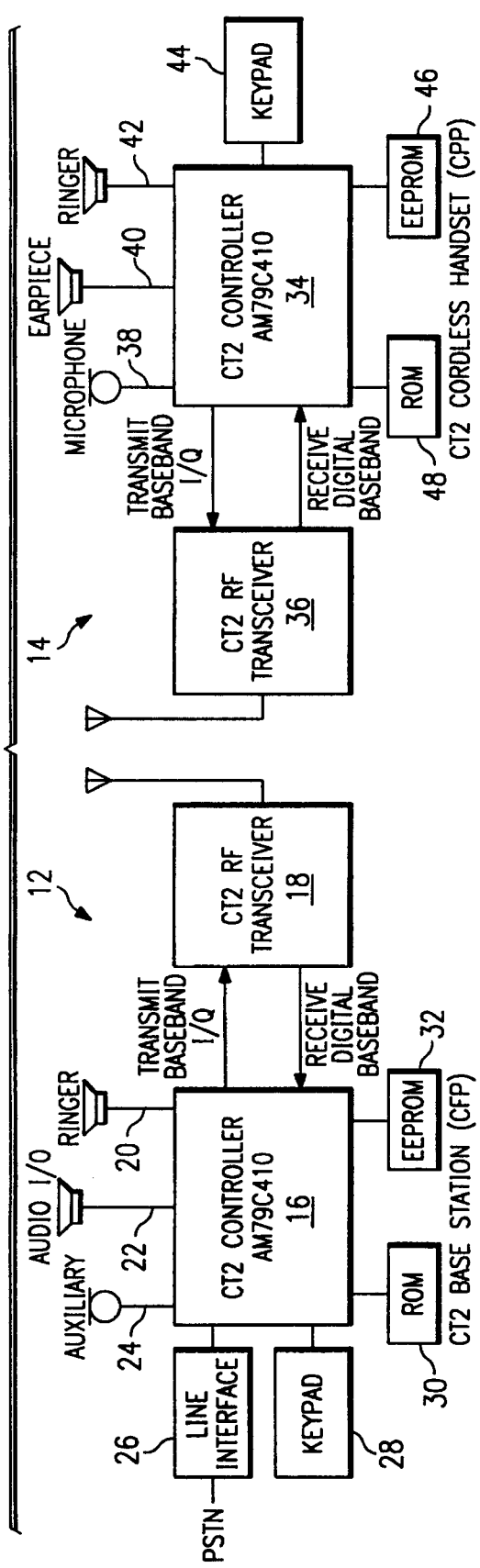
FIG. 1 illustrates a system architecture for implementing the present embodiment.

With reference to FIG. 1, one embodiment of the present invention uses a communications controller circuit such as the Am 79C410 that Advanced Micro Devices of Sunnyvale, Calif. produces and that has the trademark name "CT2 PhoX™" controller for digital cordless telephones (hereinafter CT2 controller). With this device, FIG. 1 shows a wireless communication system 10 that includes base station 12 and hand set 14. Base station 12 has as its communications controller circuit CT2 controller 16 that communicates through CT2 RF transceiver 18. Ringer 20 connects to CT2 controller 16 to notify the user of an incoming call. Audio input/output (I/O) connection 22 provides the user controller communications path. Auxiliary audio connection 24 allows for auxiliary audio communications to devices such as a facsimile or modem device. Communications line interface circuit 26 interfaces CT2 controller 16 with a hard-wire communications line, if desired. Keypad interface 28 permits control of base station 12 via keypad entry. ROM 30 and EEPROM 32 provide needed memory functions for CT2 controller 16. Through these components, base station 12 communicates with hand set 14. Hand set 14 also includes CT2 controller 34 that communicates through CT2 RF transceiver 36. Connections to controller 34 are similar to those of CT2 controller 16 and include microphone 38, earpiece 40, ringer 42, keypad 44, and memory devices such as EPROM 46 and ROM 48.

CT2 controllers 16 and 34 perform protocol functions, data formatting, audio processing and peripheral communications for a common air interface CT2 digital cordless telephone. It is within this digital cordless telephone environment of wireless communication system 10 that one embodiment of the present invention operates to take advantage of the high integration and low power consumption that CT2 controllers 16 and 34 provide. Within a controller such as CT2 controllers 16 or 34, the present embodiment provides data enciphering and deciphering sufficient to make private the wireless communications between base station 12 and hand set 14.

An attractive feature of the present system is the high degree of privacy that results from minimal hardware and software changes to CT2 controllers 16 and 34. The exact amount of strength in the privacy function that the present embodiment obtains, however, is a function of a number of engineering variables. Adding more logic or program control and increasing data storage capacity over that of a standard 79C410 CT2 controller provides even stronger privacy. The present embodiment, however, provides an architecture that imposes privacy on the air link between hand set 14 and base station 12 and within an architecture achievable through software-only changes in communications controller 16 and 34. For the present embodiment, therefore, private communications functions are reprogrammable and may include authenticating in a challenge-response-authentication sequence and developing a session key during wireless communications.

Figure 2:
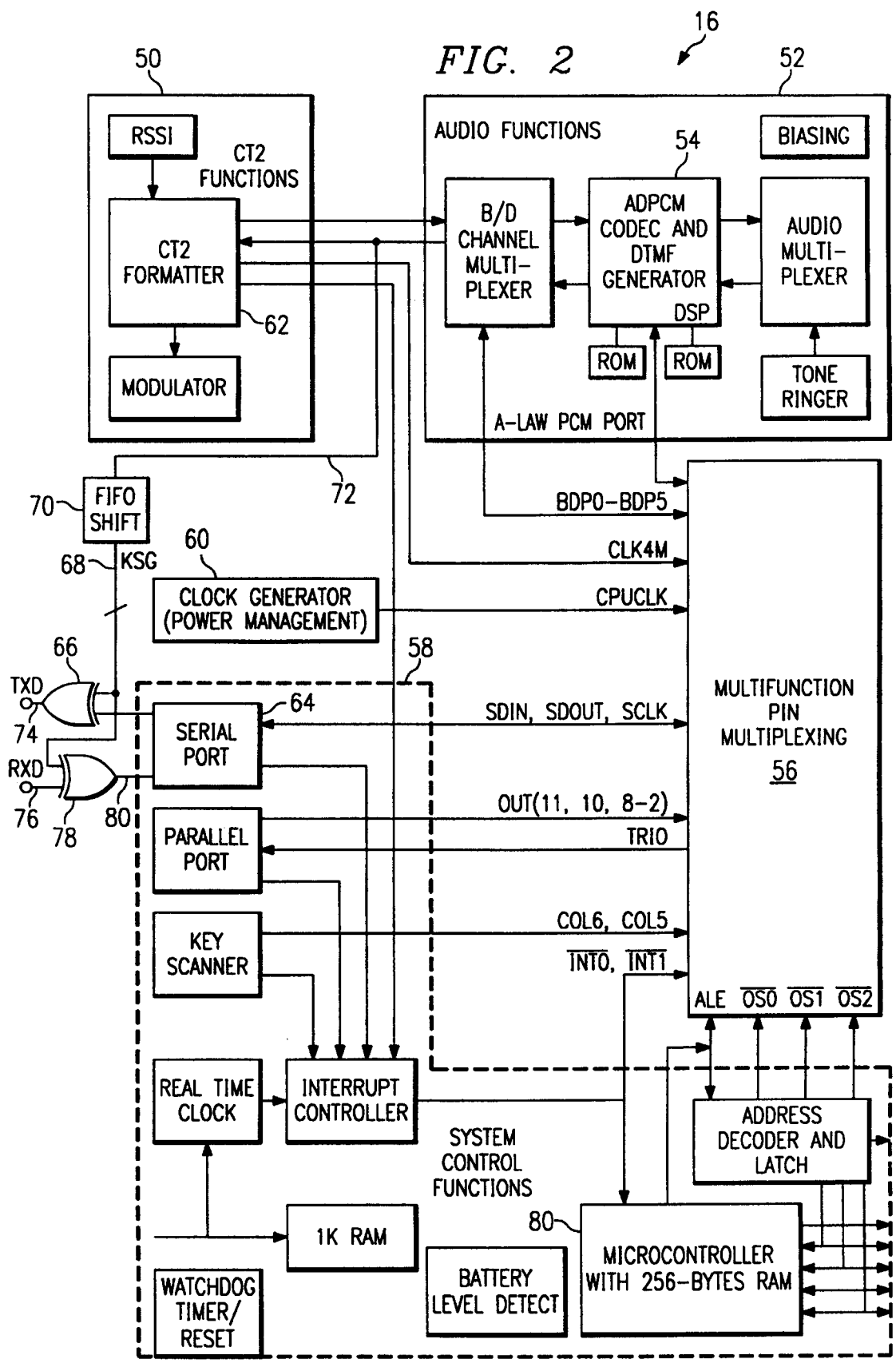
FIG. 2 provides a block diagram of a communications controller circuit usable in one embodiment of the present invention.

To illustrate how the present embodiment achieves its desired results, reference is now made to the FIG. 2 schematic block diagram of the circuitry within CT2 controller 16. In FIG. 2, CT2 controller 16 includes CT2 functions circuit 50 that communicates with audio functions portion 52. Audio functions portion 52 includes ADPCM (i.e., the Adaptive Differential Pulse Code Modulation technique of the CCITT G.721 international standard) codec and DTMF generator 54 that includes a digital signal processor (DSP) for performing, among other functions, enciphering and deciphering in carrying out various functional aspects of the present embodiment. Formatted CT2 functions flow from audio functions portion 52 to multifunction pin multiplexing circuit 56 and system control functions circuit 58. Clock generator 60 provides necessary clock signals for power management of multifunction pin multiplexing circuit 56. The operation of circuitry that satisfy the structural and functional requirements of CT2 controller 16 in the present embodiment appears in the design specification for the 79C410 CT2 PhoX™ control circuit. This specification is expressly incorporated herein by reference.

The ADPCM codec and DTMF generator 54 can implement a variety of privacy functions on a programmably selective basis. The privacy functions may be, for example, existing enciphering algorithms such as, for example, the United Kingdom enciphering algorithm "F," that algorithm having the name "BONUS," or the "Data Enciphering Standard" or DES enciphering algorithm, as well as a wide array of other such algorithms that may not even exist today but that have common features with existing enciphering algorithms. The operation of the enciphering functions within ADPCM codec and DTMF generator 54 for purposes of the present embodiment appears more fully below in association with FIG. 3 and The present embodiment modifies the CT2 PhoX™ control circuit to provide a way to load, store, and execute additional digital signal processing programs in audio functions circuit 52 that implements G.721 transcoding, DTMF tone generation, and other audio signal processing functions. A standard 79C410 DSP executes its instructions entirely from a read-only instruction memory or IROM. The present embodiment adapts the 79C410 circuit to form CT2 controller 16 by substituting a read-write instruction random access memory or IRAM of a size suitable to allow it to perform any of the class of anticipated privacy functions.

U.S. patent application Ser. No. 07/983,477 by B. Stewart and R. Feemster and assigned to Advanced Micro Devices, Inc. of Sunnyvale, Calif. (hereinafter Stewart) describes an execution vector sequence that applies to the 79C410 and describes certain aspects of the 79C410 architecture. For the purpose of more clearly illustrating the application of the present embodiment as well as other relevant purposes, Stewart is incorporated herein by reference. Accordingly, modifications that the present embodiment makes to the 79C410 include connecting XOR gate 66 to serial port 64 of system control functions portion 568. XOR gate 66 exclusively XORs the output of serial port 64 with the FIFO shift output on line 68 that comes from FIFO shift circuitry 70. Audio functions portion 52 controls the operation of FIFO shift circuitry 70 via line 72 to control the output of XOR gate 66. As a result of the operation of XOR gate 66, output line 74 sends encrypted communication signals from CT2 controller 16.

When encrypted communication signals appear on input line 76, they go to XOR gate 78 as does the key string or pseudo random number generator signal from FIFO shift circuitry 70 along line 68. Output from XOR gate 78 goes along line 80 to serial port 64. These are impressed upon on the communication signals that CT2 controller 16 decrypts.

Figure 3:
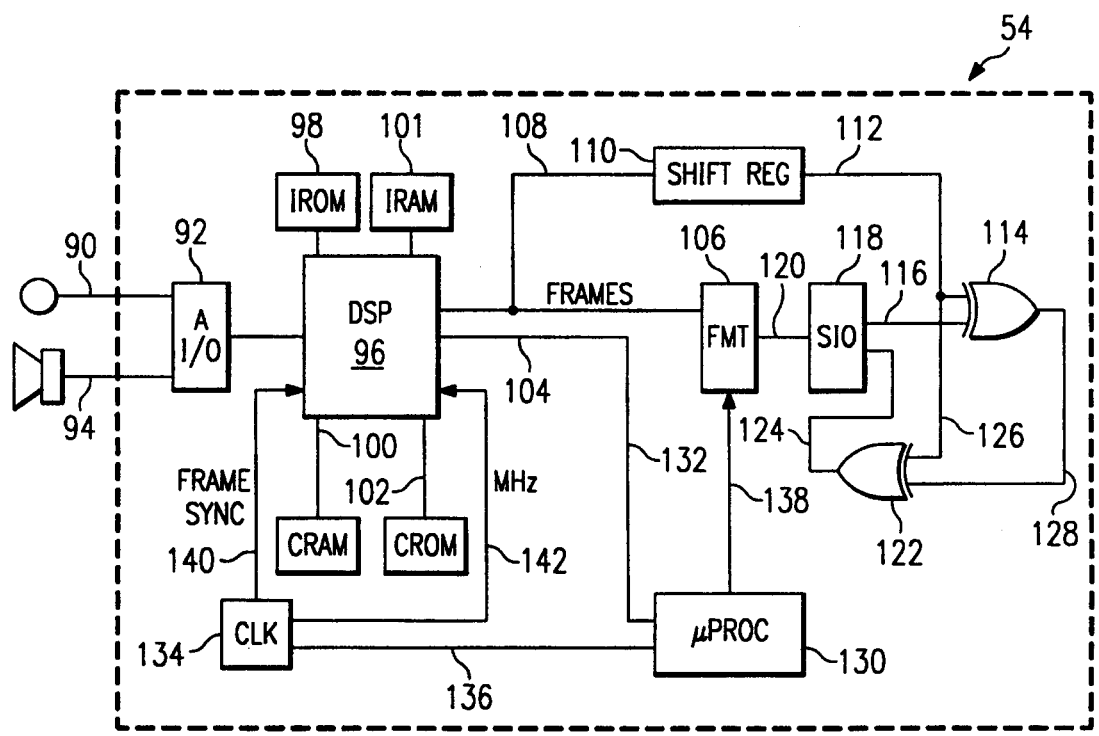
FIG. 3 provides a block diagram of the ADPCM code and DTMF generator within the communications controller of the present FIG. 2 embodiment.

To describe in yet more detail the structure and function of the present embodiment, FIG. 3 provides a block diagram of the circuitry of ADPCM codec and DTMF generator 54 hereinafter generator 54 of CT2 controller 16. Generator 54 receives analog input via input 90 to analog I/O circuit 92. Analog I/O circuit 92 also outputs audibly via speaker 94. Communications signals flow between DSP 96 and analog I/O circuit 92. DSP 96 has various connections with instruction read-only memory (IROM) 98, coefficient (CRAM) 100, and coefficient CROM 102. Frame lines 104 connect between DSP 96 and FMT 106. Line 108 also connects between frame lines 104 and shift register 110. Shift register 110 output 112 goes to XOR gate 114 as does output 116 from serial I/O circuit 118. Serial I/O circuit 118 provides output 116 in response to input from line 120 that connects to FMT 106. XOR gate 122 also provides to serial I/O circuit 118 input 124 which is the exclusivity-OR'd output of the signal from line 126 and serial data input 128. Microprocessor 130 receives DSP 96 output via line 132 and clock signal from clock circuit 134 via line 136. Output for microprocessor 130 through line 138 drives FMT 106. Clock circuit 134 provides multiple clocking signals such as those through lines 140 and 142.

For purposes of the present embodiment, digital signal processor (DSP) implementing the CCITT G.721 transcoder is modified from the specified 79C410 configuration by adding circuitry and instructions for the purpose of reading the frame counter of step 200. Additionally, a compliance code that the DSP contains is removed and a single enciphering algorithm is programmed in its place in DSP IROM 98 of FIG. 3.

In the standard 79C410 manufacture, DSP 96 can only execute a single program stored in this IROM at time of manufacture. The present embodiment adds to IROM 98 a random access (read-write) memory, or IRAM 101. As a result, not only does the CT2 controller 16, and hence hand set 12, as a whole have a useful function independent of enciphering and deciphering the telecommunications data streams (it would still be a voice coder with G.721 compression stored in ROM), but also there are uses of the modifications that do not relate only to enciphering or deciphering. IRAM 101 may receive code for the purpose of demonstrating compliance with G.721 voice compression standards. IRAM 101 may also serve in the functions of enciphering and deciphering processed communication signals, forward error correction, and channel equalization if desired. The loading of IRAM 101 requires specially-designed software to accomplish the conversion of the device to a privacy function via the loading of IRAM 101. This approach is satisfactory for some privacy requirements.

Yet another embodiment of the present invention removes the compliance code from the DSP and replaces the IROM space of the compliance code with the IRAM 101 as in the magneto-optic disk motion controller that is described in detail in U.S. patent application Ser. 08/100,152 assigned to Advanced Micro-Devices, Inc., of Sunnyvale, Calif. (hereinafter the "MOMC controller"). The MOMC controller includes a DSP device that has an instruction random access (read-write) memory IRAM attached to a DSP that is similar in some respects to DSP 96 of FIG. 3. Using the MOMC controller at manufacturing, a manufacturer may load the compliance code for testing, as appropriate. In the field, a user may load this same IRAM space with whatever algorithm happened to be required or whatever may be politically correct at the moment to affect an appropriate enciphering scheme to achieve private wireless communications according to the present invention.

Figure 4:
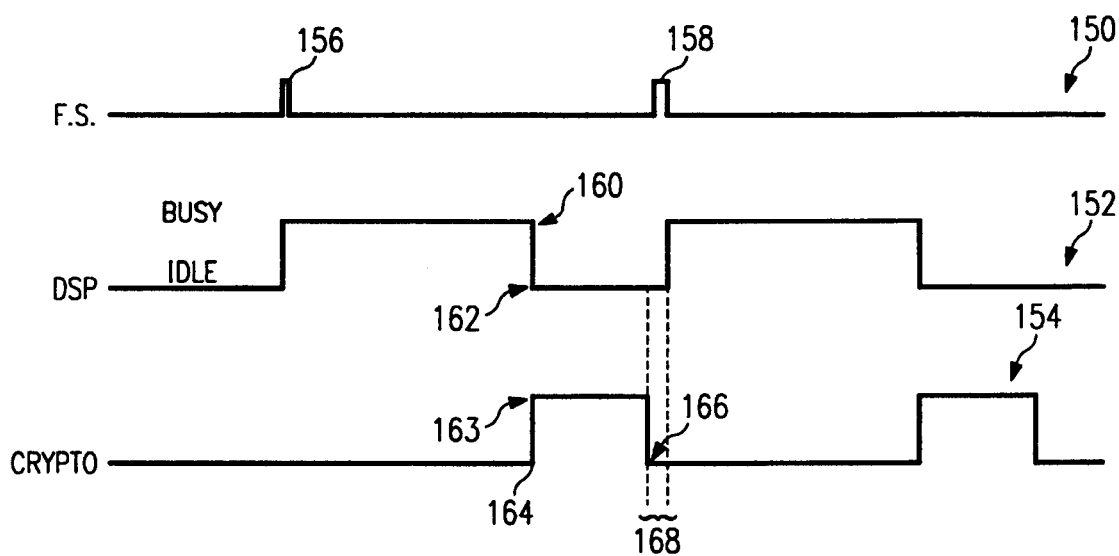
FIG. 4 provides a set of exemplary timing diagrams for the frame synchronizing signal, DSP operation, and communications signal encryption according to the present embodiment.

FIG. 4 shows timing diagrams for frame synchronizing or synch signal 150, DSP 96 processing signal 152 and enciphering/deciphering processing signal 154. The present embodiment causes DSP 96 to process voice signals according to the information in each frame of data from analog I/O circuit 92. Thus, at each frame synch signal pulse such as those at reference numerals 156 and 158 of frame synchronizing signal timing diagram 150, DSP 96 processes one frame worth of analog input or output. Note that, according to timing diagrams 150 and 152, there is a time between frame synch signals 156 and 158 when DSP 96 is busy, as line level 160 indicates and a time when DSP 96 is idle, as level 162 indicates. The present embodiment uses this idle DSP 96 processing time to encipher or decipher the telecommunication signals. That is, the present embodiment uses DSP 96 to encipher and decipher the data stream of the telecommunications signal during the time that DSP 96 is not otherwise processing the communications signal.

As enciphering/deciphering timing diagram 154 illustrates, once DSP 96 discontinues processing the frame of communication signals and the processing activity ceases, DSP 96 processing timing diagram shifts from the busy level 160 to the idle level 162 and enciphering or deciphering of the frame of data, as appropriate, begins. Enciphering/deciphering timing diagram 154 indicates this change by shifting from idle level 164 to busy level 166. This continues until enciphering or deciphering is complete, as the shift from busy level 166 to idle level 164 shows. Note, however, that the shift from enciphering/deciphering busy level 166 to idle level 164 occurs before the next frame synch signal 158.

Figure 5:
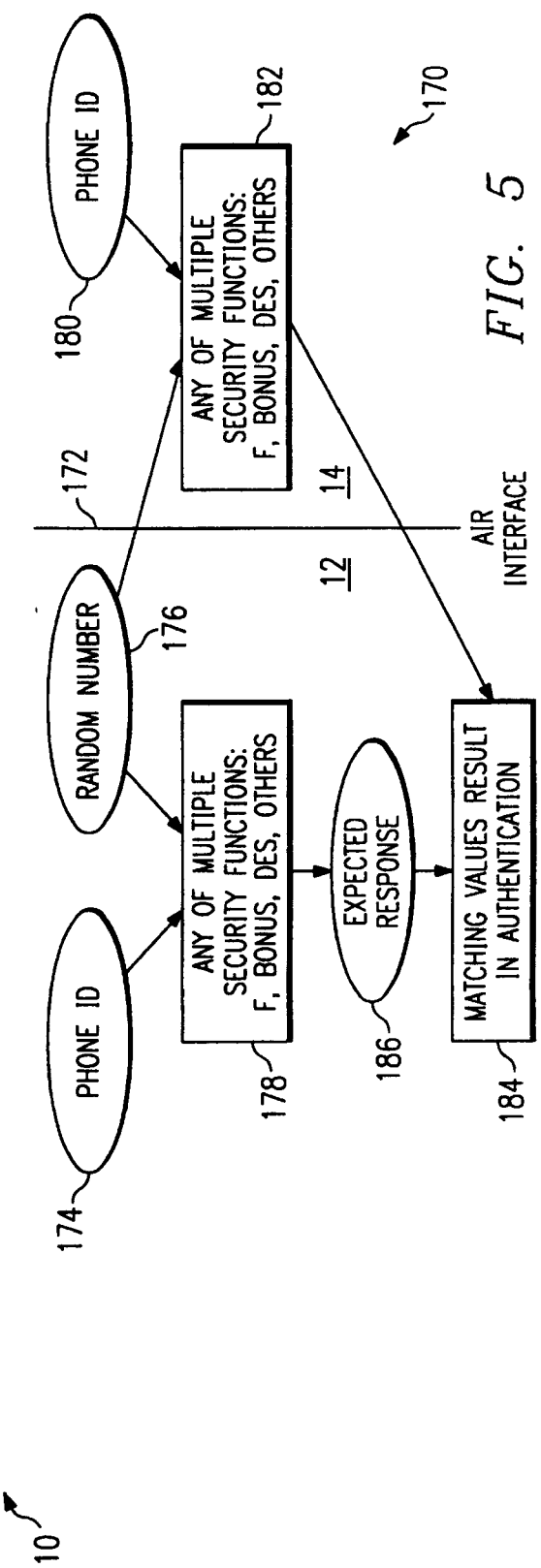
FIG. 5 provides a flow chart of an exemplary authentication process according to the present embodiment.

The enciphering and deciphering functions of the present embodiment may include both authentication and session key generation within CT2 controller 16 to make communications between hand set 14 and base station 12 private. The various steps that the inventive concepts encompass may be implemented in either software or hardware, or both hardware and software. FIG. 5 illustrates conceptually one way to perform the authentication process 170 of the present invention. Line 172 represents the air interface between base station 12 and hand set 14. At base station 12, signal processing circuitry generates phone identifier 174 and random number 176, both of which CT2 controller 16 directs to privacy function 178. The combination of random number 176 and phone identifier 174 proceed through privacy function 178 that performs the enciphering to generate an expected response at step 180. Simultaneously, hand set 14 generates phone identifier 182 which has the same value or meaning as phone identifier 174 within base station 12. In hand set 14, privacy function 184 (which is the same privacy function that base station 12 employs) receives from base station 12 data that includes random number 176 and phone identifier 182. Any one of a number of high-quality random number generators, based on key stroke timing or some other random variable, may be used to generate random number 176. The output of privacy function 184 goes to matching function 186 as does the expected response from step 180. In CT2 controller 16, all calculations to implement authentication process 170 need not be performed in real time and, therefore, may be scheduled according to the available enciphering and deciphering windows the timing diagrams of FIG. 4 indicate.

A strength of authentication process 170 is that phone identifiers 174 and 180 never appear over air interface 172. A sophisticated attacker of this system, however, may be able to mount a "known-plain text attack" to determine the enciphering key if he had been monitoring the air interface and could reliably determine which of the several possible algorithms specified as privacy functions 178 and 182 were in use. With increased clock rates or different system operating characteristics, however, this task becomes difficult. Additionally, the present invention may use other enciphering algorithms that are more strongly resistant to this type of attack than are the F, BONUS, or DES enciphering algorithms of privacy functions 180 and 184.

As yet a further example of an encryption scheme that the present embodiment may employ, reference is made to U.S. Pat. No. 4,405,829 filed on Dec. 14, 1977 by Rivest et al. entitled "Cryptographic Communications System and Method" and assigned to the Massachusetts Institute of Technology, Cambridge, Mass. (hereinafter Rivest). Rivest describes a paired key encryption system where a decoding device and an encoding device is coupled to a communication channel. The encoding device is responsive to an applied message-to-be-transmitted M and an encoding to provide a cipher text word C for transmission to a particular decoding device. The encoding key E is a pair of positive integers e and n which are related to the decoding device. The present embodiment may employ the techniques of Rivest. For this purposes, as well as other purposes consistent with the scope of the present invention, Rivest is herein incorporated by reference.

Figure 6:
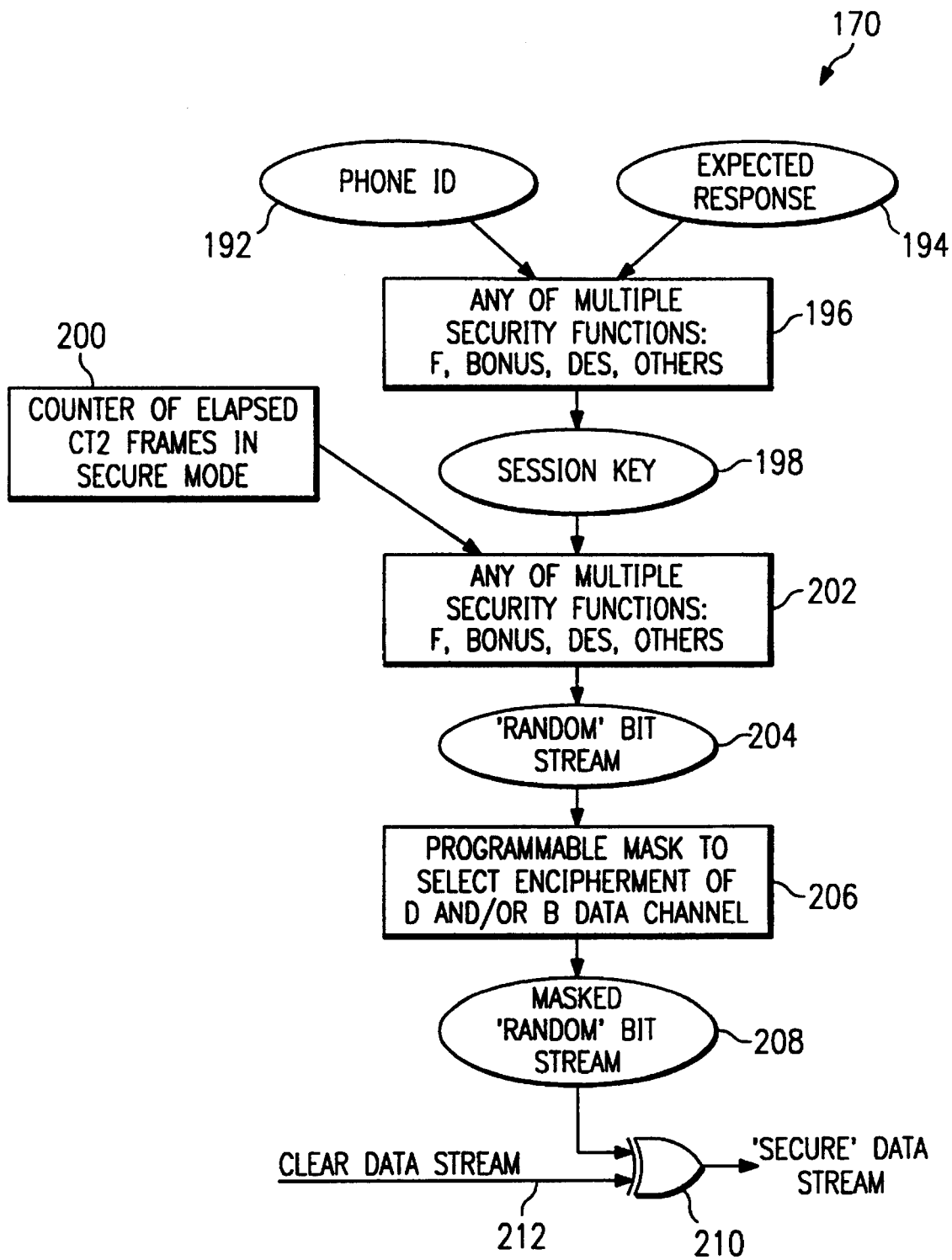
FIG. 6 is a flow chart of a session key generation process according to the concepts of the preferred embodiment.

FIG. 6 shows private data stream generation process 190 of one embodiment of the present invention. Beginning at step 192, process 190 begins by generating a phone identifier and, at step 194, an expected response. These two inputs go to privacy function 196 which may be an F, BONUS or DES algorithm or some other enciphering algorithm. From privacy function 196, a session key 198 results. The session key 198 combines with the output from counter function 200 that counts the elapsed CT2 frames in the secure or private mode. These two inputs then go to step 202 where any one of numerous different privacy functions may be employed to generate a "random" bit stream as step 204 indicates. The result from the random bit stream of step 204 is a programmable mask to select the encipherment of D and or B channel data at step 206. The programmable mask generates a masked random bit stream at step 208. The masked random bit stream of step 208 then flows through logical XOR circuit 210 with a clear data stream as line 212 indicates. The result is a private data stream that is communicated from either base station 12 through controller circuit 16 or hand set 14 through controller circuit 32. That is, session key generation process 190 may be performed at both base station 12 and hand set 14 to achieve two-way private wireless communications.

As FIG. 6 describes, therefore, after authentication the system of the present embodiment provides various privacy functions 196 to recombine the session key of step 198 and the expected response-data at step 194 to result in the random bit stream of step 204. The enciphering algorithm of privacy function 196 may be reapplied a number of times to yield a session key of the appropriate length. Once the session key is derived, privacy function 202 further enciphers the session key of step 198 with the counter data of step 200. Note that the present embodiment simultaneously derives the session key on both sides of the air interface 102, but the session key never itself appears on the air interface. The first application of the enciphering function at step 196 produces a session key as indicated by step 198. This step need not be performed in real time and, therefore, may be done in a general purpose microprocessor such as microprocessor 130 of FIG. 3. The second enciphering function occurs in real time during the enciphering function busy level 166 of enciphering/deciphering timing diagram 154 of FIG. 4. This process may be performed by adding to the CT2 controller 16, for example, both the logic to provide the low-level bit modification and circuitry and instructions for implementing the enciphering function of step 202 real time.

The data flow of FIG. 6 further shows combining clear data at clear data stream 212 with a pseudo-random bit stream 208 that masking step 206 generates. Pseudo-random bit stream 208 may be duplicated on the other side of air interface 172. XOR circuitry 210 assures that single-bit errors that occur on air interface 172 will not propagate beyond the frame location at which they occur and then go across air interface 172. Single-bit errors, therefore, will not affect the circuitry within communications controller 16 that already exists to deal with errors. Note, however, that the present inventive concepts are not confined to correcting for single-bit errors. The arbitrary privacy scheme of the present invention may use block encryption algorithms that communicate blocks, instead of streams, of data from one point to another. The DSP could then perform the desired forward error correction on the other side on the blocks of data.

The preferred embodiment of the present invention may be retrofitted economically and practically into an already manufactured CT2 controller. Required changes include, for example, adding a logic circuit that has FIFO shift circuit 70, XOR gate 66, XOR gate 76 and the above-mentioned memory circuits associated with audio functions portion 52, all of FIG. 2. Additionally, the instructions to perform programmable mask step 206 and the XOR logic function to encipher or decipher the data stream may be added to generator 54 of FIG. 3. Frame counter 106 of FIG. 3 may be implemented in CT2 functions circuit 50, preferably within generator 54.

Although operation of the present embodiment is clear from the above description, the following description of the operation appears for completeness. CT2 controllers 16 and 34 can perform most privacy and authentication schemes of public-access cordless telephone in use at the present time throughout the world. Further, the programmability of the device now renders it generally useful for rather arbitrary privacy schemes and in other public access schemes. The following scheme, which is roughly descriptive of several standard schemes, provides an example of operation with the present embodiment.

The present embodiment, therefore, provides wireless communication privacy for cordless and cellular telephony and local area network (LAN), a wide area network (WAN), and wireless data exchange. The method and system of the present embodiment authenticates a mobile unit such as hand set 14 and enciphers data in a control stream from the mobile unit to another mobile unit or to base station 12. By adding the XOR-based enciphering logic and the appropriate enciphering and deciphering algorithms in CT2 controller, the capability to support various privacy schemes results.

Similarly, a system of paired processors such as CT2 controllers 16 and 34, but implementing different data protocols and perhaps different functions than the G.721 speech compression, for example, lossless arbitrary-data compression may be implemented with the present embodiment. Such a system may be described for voice wireless link systems, where the data to be carried is not voice data but other arbitrary data streams. An example of comparison algorithms may be those which use a dictionary to store compression and decompression information, such as the first and second methods of Lempel and Zir, called LZ1 and LZ2, respectively. These methods are disclosed in U.S. Pat. No. 4,464,650 to Eastman et al., and various improvements in the algorithms as disclosed in U.S. Pat. No. 4,558,302 to Welch, U.S. Pat. No. 4,814,746 to Miller et al., and U.S. Pat. No. 5,243,341 to Serouss et al. The present embodiment may use some or all of these techniques. As necessary to understand their use and application to the present invention, therefore, the above U.S. Patents are herein incorporated by reference.

The present embodiment provides pair-key authentication scheme that occurs during call set-up and exchanges the session key for a keystream generation algorithm. The keystream generation algorithm processes the data being exchanged during the call. By operating in this mode, paired-key algorithms of rather arbitrary complexity can be executed by microprocessor 130 within generator 54, since the call set-up, authentication, billing information and session key exchange functions do not have to occur to generate a real-time keystream for impressing upon the voice data. A separate keystream generation algorithm, loaded into the IRAM, performs keystream generation in the idle time of the DSP after it processes each frame of G.721 speech compression. Keystream algorithms of greater complexity can be accommodated by choosing a suitable size of IRAM to hold the desired algorithm's instruction codes and by increasing the system clock speed to allow the keystream generation to complete in the idle time after the processing of each G.721 speech data frame. This is described in the example of FIG. 4, above.

A further example operation may be seen in call-initiating and responding unit, each based on the modified 79C410 as described above, the following sequence of events may occur to establish an authentic, private communications channel. At the initiation of the call, the initiating CT2 controller executes a microprocessor-based program to cause the generation of a call-setup message using the private portion of the paired key associated with the unit to be exchanged. After authentication by the responding CT2 controller unit, using the public portion of the paired key associated with the unit, a non-realtime private link for exchange of billing information and session key, or even optionally, the particular keystream generation algorithm, is established. The appropriate keystream algorithm is loaded into both the initiating and responding CT2 controller, and synchronous identical keystreams are generated for insertion and extraction of the data stream over a private air link. The result is the enciphering and deciphering of data between base station 12 and hand set 14 that makes communication between these points private.

In summary, therefore, the present embodiment provides a method and system for privately communicating over a wireless communication network that includes a communications controller that provides private communication of communications signals such as voice signals over a wireless communications network. The controller includes a signal processing circuit for processing the communications signals to form processed communication signals and for enciphering the processed communications signals. Processing may include encoding, compression, channel equalization, and forward error correction modulation of the communication signals. A transceiver associates with the communications controller to transmit the enciphered and processed communication signals that the communication controller circuit produces.

A further aspect of the present embodiment is a system that includes the above communications controller at a first sending location such as a mobile unit and a chip communications controller at a receiving location that receives the enciphered and processed communications signals. The receiving communications controller circuit deciphers and processes the communications signals for completing the wireless transmission. At the second communications controller, processing includes decoding, decompressing, and channel equalization, if necessary.

Although the invention has been described in detail in the foregoing for the purpose of illustration, it is to be understood that such detail is solely for that purpose. For example, not only can a data stream of voice data from a voice-compression DSP have application in the present invention, but also an arbitrary data stream can be protected according to the inventive concepts presented herein.

Another alternative embodiment of the present invention may be to provide the above described point-to-point secure communications on insecure LANs. The present invention makes possible digital signature authentication and message encryption using either a single DSP or a single microprocessor, or using both a DSP and a microprocessor or even a separate security processing unit or a dedicated or small DSP to contain in hardware or software various encryption algorithms and the ability to execute instructions for performing such algorithms. To protect these algorithms and related encryption data, various physical schemes may be, for example, schemes that erase the encryption algorithms and data on any sign of tampering or reverse-engineering attempts. These schemes are well-known in the prior art. Various other protection schemes that prevent chip-probing equipment from accessing information from the processor directly may also be used. Therefore, variations may be made therein by those skilled in the art without departing from the spirit and scope of the invention except as may be limited by the claims.

What is claimed is:

1. A method for privately communicating over a wireless communications network, comprising the steps of:

processing the communication signals in a first signal processing circuit within a first communications controller circuit at a first location to produce processed communication signals;

enciphering the processed communication signals in the first signal processing circuit at said first location to produce enciphered and processed communication signals;

transmitting the enciphered and processed communication signals between a first location and a second location using the first communications controller circuit at said first location;

receiving the enciphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location.

2. The method of claim 1, wherein said enciphering step further comprises the steps of:

embedding an enciphering algorithm within the first signal processing circuit; and enciphering the processed communication signals using the embedded enciphering algorithm.

3. The method of claim 2, wherein said deciphering step further comprises the steps of:

embedding a deciphering algorithm within the second signal processing circuit; and deciphering said processed communication signals using said embedded deciphering algorithm.

4. A method for privately communicating over a wireless communications network, comprising the steps of:

processing the communication signals in a first signal processing circuit within a first communications controller circuit at a firs location to produce processed communication signals;

enciphering the processed communication signals in the first signal processing circuit at said first location to produce enciphered and processed communication signals;

transmitting the enciphered and processed communication signals between a first location and a second location using the first communications controller circuit at said first location;

receiving the eniphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location;

wherein said enciphering step further comprises the steps:

embedding an enciphering algorithm within the first signal processing circuit after manufacturing said first communications controller circuit; and enciphering the processed communication signals using the embedded enciphering algorithm.

5. The method of claim 2, wherein said enciphering step further comprises the step of enciphering the process communication signals in a dedicated signal processing unit of the first signal processing circuit, dedicated signal processing unit being tasked to perform said enciphering step.

6. The method of claim 4, wherein said enciphering algorithm embedding step comprises the step of embedding an F enciphering algorithm in said first signal processing circuit.

7. The method of claim 4, wherein said enciphering algorithm embedding step comprises the step of embedding a DES enciphering algorithm in said first signal processing circuit.

8. The method of claim 4, wherein said enciphering algorithm embedding step comprises the step of embedding a BONUS enciphering algorithm in said first signal processing circuit.

9. The method of claim 4, wherein said enciphering algorithm embedding step comprises the step of embedding a DECT standard enciphering algorithm in said first signal processing circuit.

10. A method for privately communicating over a wireless communications network, comprising the steps of:

processing the communication signals in a first signal processing circuit within a first communications controller circuit at a first location to produce processed communication signals;

enciphering the processed communication signals in the first signal processing circuit at said first location to produce enciphered and processed communication signals;

transmitting the enciphered and processed communication signals between a first location and a second location using the first communications controller circuit at said first location;

receiving the enciphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location;

wherein said enciphering step further comprises the step of enciphering said processed communication signals in said first signal processing circuit by programmably selecting an enciphering algorithm.

11. The method of claim 10, wherein said programmably selecting step further comprises the step of programmably selecting the enciphering algorithm from among the group consisting essentially of an F enciphering algorithm, a DES enciphering algorithm, and a BONUS enciphering algorithm.

12. The method of claim 10, wherein said deciphering step further comprises the step of deciphering the processed communication signals in a dedicated signal processing unit of the second signal processing circuit, the dedicated signal processing unit being tasked to perform said deciphering step.

13. A method for privately communicating over a wireless communications network, comprising the steps of:

processing the communication signals in a first signal processing circuit within a first communications controller circuit at a first location to produce processed communication signals;

enciphering the processed communication signals in the first signal processing circuit at said first location to produce enciphered and processed communication signals;

transmitting the enciphered and processed communication signals between first location and a second location using the first communications controller circuit at said first location;

receiving the enciphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location;

wherein said deciphering step comprises the step of embedding a deciphering algorithm in said second signal processing circuit after manufacturing said second communications controller circuit.

14. The method of claim 13, wherein said deciphering algorithm embedding step comprises the step of embedding an F deciphering algorithm in said second signal processing circuit for deciphering communication signals first enciphered using an F enciphering algorithm.

15. The method of claim 13, wherein said deciphering algorithm embedding step comprises the step of embedding a DES deciphering algorithm in said second signal processing circuit for deciphering communication signals first enciphered using a DES enciphering algorithm.

16. The method of claim 13, wherein said deciphering algorithm embedding step comprises the step of embedding a DECT standard enciphering a algorithm in said second signal processing circuit.

17. The method of claim 13, wherein said deciphering algorithm embedding step comprises the step of embedding a BONUS deciphering algorithm in said second signal processing circuit for deciphering communication signals first enciphered using a BONUS enciphering algorithm.

18. A method for privately communicating over a wireless communications network, comprising the steps of:

processing the communication signals in a first signal processing circuit within a first communications controller circuit at a first location to produce processed communication signals;

enciphering the processed communication signals in the first signal processing circuit at said first location to produce enciphered and processed communication signals;

transmitting the enciphered and processed communication signals between a first location and a second location using the first communications controller circuit at said first location;

receiving the enciphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location; and generating authentication signals from said first location, comprising performing in said first signal processing circuit the steps of:

generating a first location identifier;

receiving a randomly generated number from said second location;

employing a privacy function on said randomly generated number and said first location identifier to generate an enciphered value; and directing said enciphered value to said second communications controller circuit.

19. The method of claim 18, further comprising the step of authenticating said communication signals from said first location, said authenticating step comprising performing in said second signal processing circuit the steps of:

generating a first location identifier;

randomly generating a randomly generated number;

employing a privacy function on said randomly generated number and said first location identifier to generate an expected enciphered value;

receiving said enciphered value from said first location;

comparing said expected enciphered value to said enciphered value; and generating an authentication signal in the event that said expected enciphered value matches said enciphered value.

20. A method for privately communicating over wireless communications network, comprising the steps of:

processing the communication signals in a first signal processing circuit within a first communications controller circuit at a first location to produce processed communication signals;

enciphering the processed communication signals in the first signal processing circuit at said first location to produce enciphered and processed communication signals;

transmitting the enciphered and processed communication signals between a first location and a second location using the first communications controller circuit at said first location;

receiving the enciphered and processed communication signals at the second location using a second communications controller circuit;

deciphering the enciphered and processed communication signals in a second signal processing circuit within the second communications controller circuit at said second location; and processing the deciphered and processed communication signals in the second signal processing circuit to produce communications signals at the second location; and further comprising the step of XOR-ing said enciphered and processed communication signals with clear processed communication signals for preventing propagation of single-bit errors from said first signal processing circuit to said second signal processing circuit.

21. A system for privately communicating communications signals over a wireless communications network, comprising:

a first communications controller at a first location;

a first signal processing circuit within said first communications controller circuit at the first location for processing communications signals to form processed communication signals and further for enciphering said processed communication signals;

a first transceiver associated at said first location with said first communications controller for transmitting said enciphered and processed communication signals between said first location and a second location;

a second communications controller circuit at the second location for controlling communications at said second location;

a second transceiver associated at the second location with said second communications circuit for receiving said enciphered and processed communication signals from said first transceiver;

a second signal processing circuit within said second communications controller circuit at the second location for deciphering said received enciphered and processed communication signals, said second signal processing circuit further for processing said deciphered and processed communication signals.

22. The system of claim 21, wherein said first signal processing circuit comprises a first digital signal processing circuit.

23. The system of claim 22, further comprising a dedicated digital signal processor within said first digital signal processing circuit for enciphering said processed communication signals.

24. The system of claim 21, wherein said second signal processing circuit comprises a second digital signal processing circuit.

25. The system of claim 24, further comprising a dedicated digital signal processor within said second digital signal processing circuit for deciphering said enciphered and processed communication signals.

26. The system of claim 21, further comprising an enciphering algorithm embedded within said first signal processing circuit for enciphering said processed communication signals.

27. A system for privately communicating communications signals over a wireless communications network, comprising:

a first communications controller at a first location;

a first signal processing circuit within said first communications controller circuit at the first location for processing communications signals to form processed communication signals and further for enciphering said processed communication signals;

a first transceiver associated at said first location with said first communications controller for transmitting said enciphered and processed communication signals between said first location and a second location;

a second communications controller circuit at the second location for controlling communications at said second location;

a second transceiver associated at the second location with said second communications circuit for receiving said enciphered and processed communication signals from said first transceiver;

a second signal processing circuit within said second communications controller circuit at the second location for deciphering said received enciphered and processed communication signals, said second signal processing circuit further for processing said deciphered and processed communication signals;

wherein said first signal processing circuit comprises a first digital signal processing circuit; and wherein said first signal processing circuit further comprises circuitry and instructions for embedding said enciphering algorithm in said first signal processing circuit after first manufacturing said first communications controller circuit.

28. The system of claim 27, wherein said first signal processing circuit comprises circuitry and instructions for embedding an F enciphering algorithm in said first signal processing circuit.

29. The system of claim 27, wherein said first signal processing circuit comprises circuitry and instructions for embedding a DES enciphering algorithm in said first signal processing circuit.

30. The system of claim 27, wherein said first signal processing circuit comprises circuitry and instructions for embedding a BONUS enciphering algorithm in said first signal processing circuit.

31. The system of claim 27, wherein said first signal processing circuit comprises circuitry and instructions for embedding a DECT standard enciphering algorithm in said first signal processing circuit.

32. The system of claim 23, further comprising a deciphering algorithm within said second signal processing circuit for deciphering said enciphered and processed communication signals.

33. A system for privately communicating communications signals over a wireless communications network, comprising:

a first communications controller at a first location;

a first signal processing circuit within said first communications controller circuit at the first location for processing communications signals to form processed communication signals and further for enciphering said processed communication signals;

a first transceiver associated at said first location with said first communications controller for transmitting said enciphered and processed communication signals between said first location and a second location;

a second, communications controller circuit at the second location for controlling communications at said second location;

a second transceiver associated at the second location with said second communications circuit for receiving said enciphered and processed communication signals from said first transceiver;

a second signal processing circuit within said second communications controller circuit at the second location for deciphering said received enciphered and processed communication signals, said second signal processing circuit further for processing said deciphered and processed communication signals.

wherein said first signal processing circuit comprises a first digital signal processing circuit; and further comprising a dedicated digital signal processor within said first digital signal processing circuit for enciphering said processed communication signals;

wherein said first signal processing circuit comprises circuitry and instructions for enciphering said processed communication signals in said first signal processing circuit by programmably selecting an enciphering algorithm.

34. The system of claim 33, said first signal processing circuit further comprises circuitry and instructions for programmably selecting the enciphering algorithm from among the group consisting essentially of an F enciphering algorithm, a DES enciphering algorithm, and a BONUS enciphering algorithm.

35. A system for privately communicating communications signals over a wireless communications network, comprising:

a first communications controller at a first location;

a first signal processing circuit within said first communications controller circuit at the first location for processing communications signals to form processed communication signals and further for enciphering said processed communication signals;

a first transceiver associated at said first location with said first communications controller for transmitting said enciphered and processed communication signals between said first location and a second location;

a second communications controller circuit at the second location for controlling communications at said second location;

a second transceiver associated at the second location with said second communications circuit for receiving said enciphered and processed communication signals from said first transceiver;

a second signal processing circuit within second communication controller circuit a the second location for deciphering said received enciphered and processed communication signals, said second signal processing circuit further for processing said deciphered and processed communication signals;

wherein said second communications controller circuit further comprises circuitry and instructions for embedding a deciphering algorithm within said second signal processing circuit after first manufacturing said second communications controller circuit.

36. The system of claim 35, wherein said deciphering algorithm comprises an F deciphering algorithm embedded within said second signal processing circuit for deciphering communications signals first enciphered using an F enciphering algorithm.

37. The system of claim 35, wherein said deciphering algorithm comprises a DES deciphering algorithm embedded within said second signal processing circuit for deciphering communications signals first enciphered using an DES enciphering algorithm.

38. The system of claim 35, wherein said deciphering algorithm comprises a BONUS deciphering algorithm embedded within said second signal processing circuit for deciphering communications signals first enciphered using an BONUS enciphering algorithm.

39. The system of claim 35, wherein said deciphering algorithm comprises a DECT standard enciphering algorithm embedded within said second signal processing circuit for deciphering communications signals first enciphered using a DECT enciphering algorithm.

40. A system for privately communicating communications signals over a wireless communications network, comprising:

a first communications controller at a first location;

a first signal processing circuit within said first communications controller circuit at the first location for processing communications signals to form processed communication signals and further for enciphering said processed communication signals;

a first transceiver associated at said first location with said first communications controller for transmitting said enciphered and processed communication signals between said first location and a second location;

a second communications controller circuit at the second location for controlling communications at said second location;

a second transceiver associated at the second location with said second communications circuit for receiving said enciphered and processed communication signals from said first transceiver;

a second signal processing circuit within said second communications controller circuit at the second location for deciphering said received enciphered and processed communication signals, said second signal processing circuit further for processing said deciphered and processed communication signals; and further comprising circuitry and instructions within said first signal processing circuit for authenticating communications between said first location and said second location:

instructions within said first communications controller circuit for generating a first location identifier;

receiving circuitry associated with said first communications controller for receiving a randomly generated number from said second location;

privacy instructions embedded within said first signal processing circuit for employing a privacy function on said randomly generated number and said first location identifier to generate an enciphered value; and communications circuitry for directing said enciphered value to said second communications controller circuit.

41. The system of claim 40, further comprising within said second communications controller circuit instructions for authenticating generated authentication signals from said first location said authenticating instructions, comprising:

identifier generating instructions for generating a first location identifier;

random number generating instructions for randomly generating a randomly generated number;

privacy function instructions for transforming said randomly generated number and said first location identifier into an expected enciphered value;

receiving circuitry for receiving said enciphered value from said first location;

comparing instructions for comparing said expected enciphered value to said enciphered value; and authentication generating instructions for generating a authentication signal in the event that said expected enciphered value matches said enciphered value.

42. A system for privately communicating communications signals over a wireless communications network, comprising:

a first communications controller at first location;

a first signal processing circuit within said first communications controller circuit at the first location or processing communications signals to form processed communication signals and further for enciphering said processed communication signals;

a first transceiver associated at said first location with said first communications controller for transmitting said enciphered and processed communication signals between said first location and a second location;

a second communications controller circuit at the second location for controlling communications at said second location;

a second transceiver associated at the second location with said second communications circuit for receiving said enciphered and processed communication signals from said first transceiver;

a second signal processing circuit within said second communications controller circuit at the second location for deciphering said received enciphered and processed communication signals, said second signal processing circuit further for processing said deciphered and processed communication signals; and further comprising logic circuitry for XOR-ing said enciphered and processed communication signals with clear processed communication signals for preventing propagation of single bit errors that arise during enciphering from beyond the location at which they occur from said first signal processing circuit to said second signal processing circuit.

43. A communications controller circuit for privately communicating communication signals over a wireless communications network, comprising:

a signal processing circuit within said communications controller circuit for processing communications signals to form processed communication signals and further for enciphering said processed communication signals; and a transceiver associated with said communications controller circuit for transmitting said enciphered and processed communication signals from said communications controller circuit.

44. The controller circuit of claim 43, wherein said signal processing circuit comprises a digital signal processing circuit.

45. The controller circuit of claim 43, further comprising an enciphering algorithm embedded within said signal processing circuit for enciphering said processed communication signals.

46. The controller circuit of claim 45, further comprising a deciphering algorithm within said signal processing circuit for deciphering processed communication signals received from a second communications controller circuit.

47. A communications controller circuit for privately communicating communication signals over a wireless communications network, comprising:

a signal processing circuit within said communications controller circuit for processing communications signals to form processed communication signals and further for enciphering said processed communication signals; and a transceiver associated with said communications controller circuit or transmitting said enciphered and processed communication signals from said communications controller circuit: and further comprising an enciphering algorithm embedded within said signal processing circuit for enciphering said processed communication signals;

wherein said signal processing circuit further comprises circuitry and instructions for embedding said enciphering algorithm in said signal processing circuit after manufacturing said communications controller circuit.

48. The controller circuit of claim 47, wherein said signal processing circuit comprises circuitry and instructions for embedding an F enciphering algorithm in said signal processing circuit.

49. The controller circuit of claim 47, wherein said signal processing circuit comprises circuitry and instructions for embedding a DES enciphering algorithm in said signal processing circuit.

50. The controller circuit of claim 47, wherein said signal processing circuit comprises circuitry and instructions for embedding a BONUS enciphering algorithm in said signal processing circuit.

51. A communications controller circuit for privately communicating communication signals over a wireless communications network, comprising:

a signal processing circuit within said communications controller circuit for processing communications signals to form processed communication signals and further for enciphering said processed communication signals; and a transceiver associated with said communications controller circuit for transmitting said enciphered and processed communication signals from said communications controller circuit;

wherein said signal processing circuit comprises circuitry and instructions for enciphering said processed communication signals in said signal processing circuit by programmably selecting an enciphering algorithm.

52. The controller circuit of claim 51, wherein said signal processing circuit further comprises circuitry and instructions for programmably selecting the enciphering algorithm from among the group consisting essentially of an F enciphering algorithm a DES enciphering algorithm and a BONUS enciphering algorithm.

53. The controller circuit of claim 43, further comprising a deciphering algorithm embedded within a second signal processing circuit for deciphering said processed communication signals.

54. The controller circuit of claim 53, wherein said second communications controller circuit further comprises circuitry and instructions for embedding said deciphering algorithm within said second signal processing circuit after manufacturing said second communications controller circuit.

55. The controller circuit of claim 53, wherein said deciphering algorithm comprises an F deciphering algorithm embedded within said second signal processing circuit for deciphering communications signals first enciphered using an F enciphering algorithm.

56. The controller circuit of claim 53, wherein said deciphering algorithm comprises a DES deciphering algorithm embedded within said second signal processing circuit for deciphering communications signals first enciphered using a DES enciphering algorithm.

57. The controller circuit of claim 53, wherein said deciphering algorithm comprises a BONUS deciphering algorithm embedded within said second signal processing circuit for deciphering communications signals first enciphered using a BONUS enciphering algorithm.

58. A communications controller circuit for privately communicating communication signals over a wireless communications network, comprising:

a signal processing circuit within said communications controller circuit for processing communications signals to form processed communication signals and further for enciphering said processed communication signals; and a transceiver associated with said communications controller circuit for transmitting said enciphered and processed communication signals from said communications controller circuit; and further comprising circuitry and instructions within said signal processing circuit for authenticating communications between a location and a second location:
  instructions within said communications controller circuit for generating a location identifier;
  receiving circuitry associated with said communications controller for receiving a randomly generated number from said second location;
  privacy instructions embedded within said signal processing circuit for employing a privacy function on said randomly generated number and said location identifier to generate an enciphered value; and
  communications circuitry for directing said enciphered value to a second communications controller circuit at said second location.

59. The controller circuit of claim 58, further comprising within said second communications controller circuit instructions for authenticating said generated authentication signals from said location, said instructions comprising:
  identifier generating instructions for generating a location identifier;
  random number generating instructions for randomly generating a randomly generated number;
  privacy function instructions for transforming said randomly generated number and said location identifier into an expected enciphered value;
  receiving circuitry for receiving an enciphered value from said location;
  comparing instructions for comparing said expected enciphered value to said enciphered value; and
  authentication generating instructions for generating an authentication signal in the event that said expected enciphered value matches said enciphered value.

60. A communications controller circuit for privately communicating communication signals over a wireless communications network, comprising:
  a signal processing circuit within said communications controller circuit for processing communications signals to form processed communication signals and further for enciphering said processed communication signals; and
  a transceiver associated with said communications controller circuit for transmitting said enciphered and processed communication signals from said communications controller circuit; an
  further comprising logic circuitry for XOR-ing said enciphered and processed communication signals with clear processed communication signals for preventing propagation of single bit errors beyond a location at which they occur as a consequence of the enciphering process from said signal processing circuit to a second signal processing circuit.

* * * * *

UNITED STATES PATENT AND TRADEMARK OFFICE
CERTIFICATE OF CORRECTION

PATENT NO. : 5,592,555 C3  
APPLICATION NO. : 90/012783  
DATED : May 12, 2015  
INVENTOR(S) : Brett B. Stewart Page 1 of 1

It is certified that error appears in the above-identified patent and that said Letters Patent is hereby corrected as shown below:

Title Page, Item (10) Number: "US 5,592,555 C2" should read --US 5,592,555 C3--.

Signed and Sealed this
Twenty-eighth Day of July, 2015

Michelle K. Lee
*Director of the United States Patent and Trademark Office*

US005592555C1

(12) EX PARTE REEXAMINATION CERTIFICATE (8491st)
United States Patent
Stewart

(10) Number: US 5,592,555 C1
(45) Certificate Issued: Aug. 30, 2011

(54) WIRELESS COMMUNICATIONS PRIVACY METHOD AND SYSTEM

(75) Inventor: Brett B. Stewart, Austin, TX (US)

(73) Assignee: RPX Corporation, San Francisco, CA (US)

Reexamination Request:
No. 90/010,757, Dec. 4, 2009

Reexamination Certificate for:
Patent No.: 5,592,555
Issued: Jan. 7, 1997
Appl. No.: 08/226,717
Filed: Apr. 12, 1994

(51) Int. Cl.
*H04K 1/00* (2006.01)
*H04L 9/00* (2006.01)

(52) U.S. Cl. .................. 380/247; 380/29; 380/269; 380/270; 455/411; 713/171; 713/194

(58) Field of Classification Search .................. None
See application file for complete search history.

(56) References Cited

U.S. PATENT DOCUMENTS

| 4,555,805 A | 11/1985 | Talbot |
| 4,914,697 A | 4/1990 | Dabbish |
| 5,185,796 A | 2/1993 | Wilson |
| 5,384,847 A | 1/1995 | Hendrickson |

FOREIGN PATENT DOCUMENTS

JP  H5-83242  4/1993

OTHER PUBLICATIONS

Weinsziehr, Kiss–16V2: A One–Chip ASIC DSP Solution for GSM, IEEE Journal of Solid–State Circuits, vol. 27, No. 7, pp. 1057–1066, Jul. 1992.

*Primary Examiner*—Matthew Heneghan

(57) ABSTRACT

A method and system for privately communicating signals over a wireless communications network include the steps of and circuitry and instructions for processing communication signals in a first signal processing circuit within a first communications controller circuit at a first location to produce processed communication signals. The processed communication signals may be processed voice communication signals or any arbitrary data stream that is to be communicated from one point to another. These processed communication signals are then enciphered and transmitted from the first location to a second location over a wireless communications network where a second communications controller circuit deciphers and decompresses the received communication signals. The enciphering and deciphering may occur in a digital signal processor of the communications controller circuit. The invention permits employing yet unspecified schemes or to provide a mobile device a certain amount of ubiquitousness, since it may employ one privacy scheme in one venue and a different one in another circumstance, the method and system permit facile use of politically correct privacy schemes in different jurisdictions very flexibly.

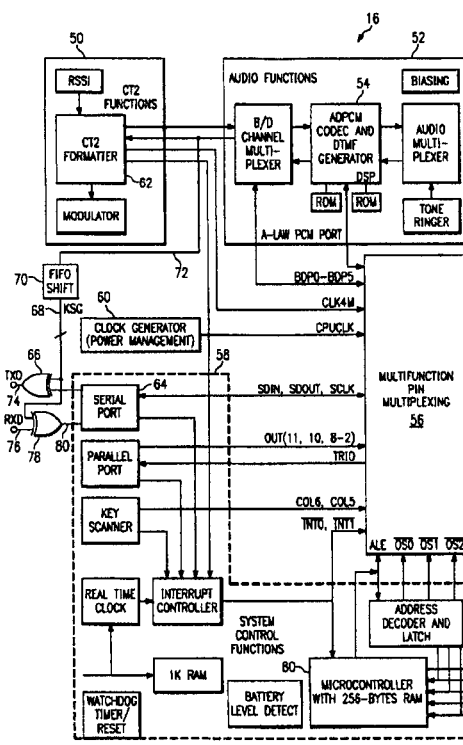

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10 and 51 is confirmed.

Claims 1, 21, 22, 24, 26 and 43-46 are cancelled.

Claims 2-9, 11-20, 23, 25, 27-42, 47-50 and 52-60 were not reexamined.

* * * * *

US005592555C2

(12) EX PARTE REEXAMINATION CERTIFICATE (10551st)
United States Patent
Stewart

(10) Number: US 5,592,555 C2
(45) Certificate Issued: Mar. 27, 2015

(54) WIRELESS COMMUNICATIONS PRIVACY METHOD AND SYSTEM

(75) Inventor: Brett B. Stewart, Austin, TX (US)

(73) Assignee: Norman IP Holdings, LLC, Tyler, TX (US)

Reexamination Request:
No. 90/013,183, Mar. 21, 2014

Reexamination Certificate for:
Patent No.: 5,592,555
Issued: Jan. 7, 1997
Appl. No.: 08/226,717
Filed: Apr. 12, 1994

Reexamination Certificate C1 5,592,555 issued Aug. 30, 2011

(51) Int. Cl.
*H04K 1/00* (2006.01)
*H04L 9/08* (2006.01)
*H04W 12/02* (2009.01)
*H04L 12/06* (2006.01)

(52) U.S. Cl.
CPC ............... *H04K 1/00* (2013.01); *H04L 9/0844* (2013.01); *H04L 2209/30* (2013.01); *H04L 2209/80* (2013.01); *H04W 12/02* (2013.01); *H04L 12/06* (2013.01)
USPC ............. 380/247; 380/269; 380/270; 380/29; 455/411; 713/171; 713/194

(58) Field of Classification Search
None
See application file for complete search history.

(56) References Cited

To view the complete listing of prior art documents cited during the proceeding for Reexamination Control Number 90/013,183, please refer to the USPTO's public Patent Application Information Retrieval (PAIR) system under the Display References tab.

*Primary Examiner* — Mark Sager

(57) ABSTRACT

A method and system for privately communicating signals over a wireless communications network include the steps of and circuitry and instructions for processing communication signals in a first signal processing circuit within a first communications controller circuit at a first location to produce processed communication signals. The processed communication signals may be processed voice communication signals or any arbitrary data stream that is to be communicated from one point to another. These processed communication signals are then enciphered and transmitted from the first location to a second location over a wireless communications network where a second communications controller circuit deciphers and decompresses the received communication signals. The enciphering and deciphering may occur in a digital signal processor of the communications controller circuit. The invention permits employing yet unspecified schemes or to provide a mobile device a certain amount of ubiquitousness, since it may employ one privacy scheme in one venue and a different one in another circumstance, the method and system permit facile use of politically correct privacy schemes in different jurisdictions very flexibly.

At the time of issuance and publication of this certificate, the patent remains subject to pending reexamination control number 90/012,783 filed Feb. 5, 2013. The claim content of the patent may be subsequently revised if a reexamination certificate issues from the reexamination proceeding.

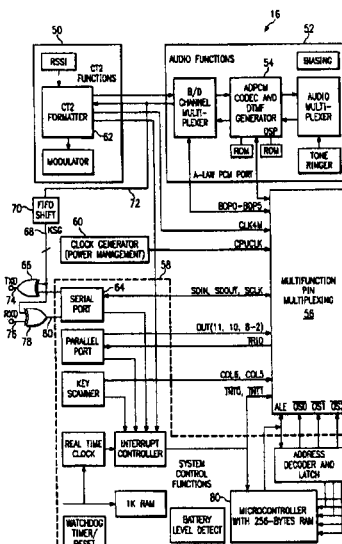

EX PARTE
REEXAMINATION CERTIFICATE
ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 4, 6-9, 13-17, 20-22, 24, 26, 35-39, 42-50, 53-57 and 60 were previously cancelled.

Claims 10-12 are cancelled.

Claims 2, 3, 5, 18-19, 23, 25, 27-34, 40, 41, 51, 52, 58 and 59 were not reexamined.

\* \* \* \* \*

US005592555C2

(12) EX PARTE REEXAMINATION CERTIFICATE (10598th)
United States Patent
Stewart

(10) Number: US 5,592,555 C2
(45) Certificate Issued: May 12, 2015

(54) WIRELESS COMMUNICATIONS PRIVACY METHOD AND SYSTEM

(75) Inventor: Brett B. Stewart, Austin, TX (US)

(73) Assignee: NORMAN IP HOLDINGS, LLC, Tyler, TX (US)

Reexamination Request:
No. 90/012,783, Feb. 5, 2013

Reexamination Certificate for:
Patent No.: 5,592,555
Issued: Jan. 7, 1997
Appl. No.: 08/226,717
Filed: Apr. 12, 1994

Reexamination Certificate C1 5,592,555 issued Aug. 30, 2011

(51) Int. Cl.
H04K 1/00 (2006.01)
H04L 9/00 (2006.01)
H04W 12/06 (2009.01)
H04W 12/02 (2009.01)
H04L 29/06 (2006.01)

(52) U.S. Cl.
CPC .............. *H04W 12/06* (2013.01); *H04W 12/02* (2013.01); *H04L 63/08* (2013.01)

(58) Field of Classification Search
None
See application file for complete search history.

(56) References Cited

To view the complete listing of prior art documents cited during the proceeding for Reexamination Control Number 90/012,783, please refer to the USPTO's public Patent Application Information Retrieval (PAIR) system under the Display References tab.

*Primary Examiner* — Roland Foster

(57) ABSTRACT

A method and system for privately communicating signals over a wireless communications network include the steps of and circuitry and instructions for processing communication signals in a first signal processing circuit within a first communications controller circuit at a first location to produce processed communication signals. The processed communication signals may be processed voice communication signals or any arbitrary data stream that is to be communicated from one point to another. These processed communication signals are then enciphered and transmitted from the first location to a second location over a wireless communications network where a second communications controller circuit deciphers and decompresses the received communication signals. The enciphering and deciphering may occur in a digital signal processor of the communications controller circuit. The invention permits employing yet unspecified schemes or to provide a mobile device a certain amount of ubiquitousness, since it may employ one privacy scheme in one venue and a different one in another circumstance, the method and system permit facile use of politically correct privacy schemes in different jurisdictions very flexibly.

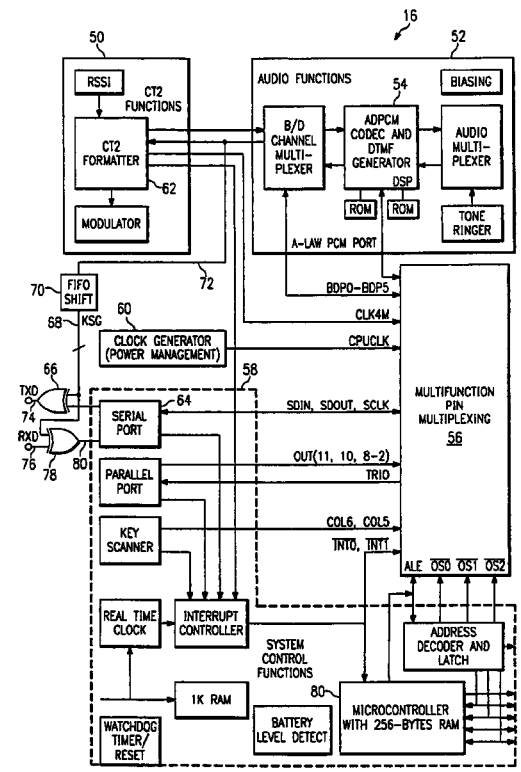

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 4, 6-17, 20-22, 24, 26, 35-39, 42-50, 53-57 and 60 were previously cancelled.

Claim 51 is cancelled.

Claims 2, 3, 5, 18, 19, 23, 25, 27-34, 40, 41, 52, 58 and 59 were not reexamined.

\* \* \* \* \*

(12) INTER PARTES REVIEW CERTIFICATE (4th)
United States Patent
Stewart

(10) Number: US 5,592,555 K1
(45) Certificate Issued: Apr. 1, 2014

(54) WIRELESS COMMUNICATIONS PRIVACY METHOD AND SYSTEM

(75) Inventor: Brett B. Stewart

(73) Assignee: Norman IP Holdings LLC

Trial Number:
IPR2013-00278 filed May 15, 2013

Petitioner: Crestron Electronics, Inc.

Patent Owner: Norman IP Holdings, LLC

Inter Partes Review Certificate for:

Patent No.: 5,592,555
Issued: Jan. 7, 1997
Appl. No.: 08/226,717
Filed: Apr. 12, 1994

The results of IPR2013-00278 are reflected in this inter partes review certificate under 35 U.S.C. 318(b).

INTER PARTES REVIEW CERTIFICATE
U.S. Patent 5,592,555 K1
Trial No. IPR2013-00278
Certificate Issued Apr. 1, 2014

AS A RESULT OF THE INTER PARTES REVIEW PROCEEDING, IT HAS BEEN DETERMINED THAT:

Claims 4, 6-9, 13-17, 20, 35-39, 42, 47-50, 53-57 and 60 are canceled.

\* \* \* \* \*